(12) United States Patent
Postgate et al.

(10) Patent No.: US 11,846,463 B2
(45) Date of Patent: Dec. 19, 2023

(54) METHOD OF CONTROLLING ATMOSPHERE IN A REFRIGERATED CONTAINER

(71) Applicant: Carrier Corporation, Palm Beach Gardens, FL (US)

(72) Inventors: Farley William Postgate, Syracuse, NY (US); Malcolm N. Fleming, Syracuse, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 91 days.

(21) Appl. No.: 16/845,338

(22) Filed: Apr. 10, 2020

(65) Prior Publication Data

US 2020/0326115 A1  Oct. 15, 2020

Related U.S. Application Data

(60) Provisional application No. 62/833,071, filed on Apr. 12, 2019.

(51) Int. Cl.
| | |
|---|---|
| *F25D 17/04* | (2006.01) |
| *B65D 81/18* | (2006.01) |
| *F25D 11/00* | (2006.01) |
| *F25D 29/00* | (2006.01) |

(52) U.S. Cl.
CPC .......... *F25D 17/042* (2013.01); *B65D 81/18* (2013.01); *F25D 11/003* (2013.01); *F25D 29/003* (2013.01)

(58) Field of Classification Search
CPC .... F25D 17/042; F25D 11/003; F25D 29/003; F25D 2317/04; B65D 81/18; B65D 81/2046–81/2092
See application file for complete search history.

(56) References Cited

U.S. PATENT DOCUMENTS

| | | | |
|---|---|---|---|
| 5,438,841 A | 8/1995 | Cahill-O'Brien et al. | |
| 5,457,963 A * | 10/1995 | Cahill-O'Brien | G05D 21/02 |
| | | | 62/78 |
| 5,515,693 A | 5/1996 | Cahill-O'Brien et al. | |
| 7,947,318 B2 | 5/2011 | Tracy | |

(Continued)

FOREIGN PATENT DOCUMENTS

| | | |
|---|---|---|
| CN | 1118759 A | 4/1996 |
| CN | 201400121 Y | 2/2010 |

(Continued)

OTHER PUBLICATIONS

Carrier Transicold, "Container Refrigeration Unit—Model 69NT40-489 with EverFresh Controlled Atmosphere", Operation and Service, 1998, 182 pages.

(Continued)

*Primary Examiner* — Elizabeth J Martin
*Assistant Examiner* — Samba Gaye
(74) *Attorney, Agent, or Firm* — CANTOR COLBURN LLP

(57) ABSTRACT

A method of operating an atmosphere control system to control an atmosphere in a refrigerated container includes operating the atmosphere control system in a start up phase to control an oxygen level in the container; ending the start up phase; and operating the atmosphere control system in a control phase to control the oxygen level and a carbon dioxide level in the container.

11 Claims, 6 Drawing Sheets

(56) References Cited

U.S. PATENT DOCUMENTS

| | | |
|---|---|---|
| 8,739,694 B2 | 6/2014 | Schaefer et al. |
| 9,121,634 B2 | 9/2015 | Rogers et al. |
| 9,314,040 B2 | 4/2016 | Delele et al. |
| 10,098,366 B2 | 10/2018 | Kamei et al. |
| 10,143,210 B2 | 12/2018 | Schaefer et al. |
| 10,168,092 B2 | 1/2019 | Tanaka et al. |
| 2014/0208795 A1 | 7/2014 | Bell |
| 2017/0112171 A1* | 4/2017 | Cermak .................. A23B 4/16 |
| 2017/0254581 A1* | 9/2017 | Kamei ................. A23B 7/0425 |
| 2018/0038625 A1 | 2/2018 | Yokohara et al. |
| 2018/0220665 A1 | 8/2018 | Savur et al. |
| 2020/0205429 A1* | 7/2020 | Stavova ................. A23B 7/148 |

FOREIGN PATENT DOCUMENTS

| | | |
|---|---|---|
| CN | 108497049 A | 9/2018 |
| EP | 2558803 A1 | 2/2013 |
| EP | 2918179 B1 | 10/2016 |
| EP | 2816890 B1 | 11/2018 |
| EP | 3054244 B1 | 1/2019 |
| EP | 3196572 B1 | 3/2019 |
| WO | 9111913 A1 | 8/1991 |
| WO | 9505753 A1 | 3/1995 |
| WO | 2013006283 A1 | 1/2013 |
| WO | 2013125944 A1 | 8/2013 |
| WO | 2015191876 A1 | 12/2015 |
| WO | 2016108951 A1 | 7/2016 |
| WO | 2016108952 A1 | 7/2016 |
| WO | 2016174288 A1 | 11/2016 |
| WO | 2017198793 A1 | 11/2017 |
| WO | 2018166713 A1 | 9/2018 |

OTHER PUBLICATIONS

European Search Report for application EP 20167512.1, dated Aug. 4, 2020, 238 pages.

Chinese Office Action for Application No. 202010273290.2, Issued Aug. 28, 2023, 8 Pages.

* cited by examiner

METHOD OF CONTROLLING ATMOSPHERE IN A REFRIGERATED CONTAINER

CROSS-REFERENCE TO RELATED APPLICATIONS

This application claims the benefit of U.S. provisional patent application Ser. No. 62/833,071, filed Apr. 12, 2019, the entire contents of which are incorporated herein by reference.

BACKGROUND

The subject matter disclosed herein relates to an atmosphere control system for a refrigerated container, and specifically to a system for regulating the atmosphere (e.g., amounts of nitrogen, oxygen, and/or carbon dioxide) inside a refrigerated container resulting in an atmospheric composition that extends post-harvest shelf life or quality of perishables, such as fruits, vegetables, pharmaceuticals, etc.

A typical refrigerated cargo container, such as those utilized to transport cargo via sea, rail or road, is a container modified to include a refrigeration unit located at one end of the container. The refrigeration unit includes a compressor, condenser, expansion valve and evaporator. A volume of refrigerant circulates throughout the refrigeration unit, and one or more evaporator fans of the refrigeration unit blow a flow of supply air across the evaporator thereby cooling the supply air and forcing it out into the container.

An atmosphere control system controls the amount of oxygen and carbon dioxide inside the refrigerated container to, for example, change the rate of ripening of produce stored in the container. The atmosphere control system may control the amount of oxygen (O2) and carbon dioxide (CO2) in the container. Existing atmosphere control systems may add nitrogen (N2) to the container.

BRIEF DESCRIPTION

In one embodiment, a method of operating an atmosphere control system to control an atmosphere in a refrigerated container includes operating the atmosphere control system in a start up phase to control an oxygen level in the container; ending the start up phase; and operating the atmosphere control system in a control phase to control the oxygen level and a carbon dioxide level in the container.

In addition to one or more of the features described herein, or as an alternative, further embodiments may include wherein the start up phase comprises adding nitrogen to the container until the oxygen level in the container is equal to an oxygen pulldown limit.

In addition to one or more of the features described herein, or as an alternative, further embodiments may include wherein the start up phase comprises adding nitrogen to the container until the oxygen level in the container is not greater than or equal to an oxygen pulldown limit.

In addition to one or more of the features described herein, or as an alternative, further embodiments may include wherein the control phase comprises determining that the carbon dioxide level in the container is greater than a carbon dioxide upper threshold.

In addition to one or more of the features described herein, or as an alternative, further embodiments may include wherein when the carbon dioxide level in the container is greater than the carbon dioxide upper threshold, adding outside air to the container until the carbon dioxide level in the container equals a carbon dioxide lower control limit.

In addition to one or more of the features described herein, or as an alternative, further embodiments may include wherein the control phase comprises determining that the oxygen level in the container is greater than an oxygen upper threshold; adding nitrogen to the container until the oxygen level in the container equals an oxygen pulldown limit.

In addition to one or more of the features described herein, or as an alternative, further embodiments may include wherein the control phase comprises determining that the oxygen level in the container is less than an oxygen lower control limit; adding outside air to the container until the oxygen level in the container equals an oxygen upper control limit.

In addition to one or more of the features described herein, or as an alternative, further embodiments may include wherein the control phase comprises determining that the carbon dioxide level in the container is greater than a carbon dioxide upper control limit; when the carbon dioxide level in the container is greater than a carbon dioxide upper control limit, adding nitrogen to the container until the carbon dioxide level in the container equals a carbon dioxide lower control limit.

In addition to one or more of the features described herein, or as an alternative, further embodiments may include adding outside air to the container until the oxygen level in the container equals an oxygen upper control limit.

In addition to one or more of the features described herein, or as an alternative, further embodiments may include wherein after ending the start up phase, adding nitrogen to the container until the carbon dioxide level in the container equals a carbon dioxide lower control limit.

In addition to one or more of the features described herein, or as an alternative, further embodiments may include adding outside air to the container until the oxygen level in the container equals an oxygen upper control limit.

In addition to one or more of the features described herein, or as an alternative, further embodiments may include after ending the start up phase, adding nitrogen to the container until the carbon dioxide level in the container equals a carbon dioxide lower control limit.

In addition to one or more of the features described herein, or as an alternative, further embodiments may include adding outside air to the container until the oxygen level in the container equals an oxygen upper control limit.

Technical effects of embodiments of the present disclosure include controlling atmosphere in the interior of a container.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

Figure 1:
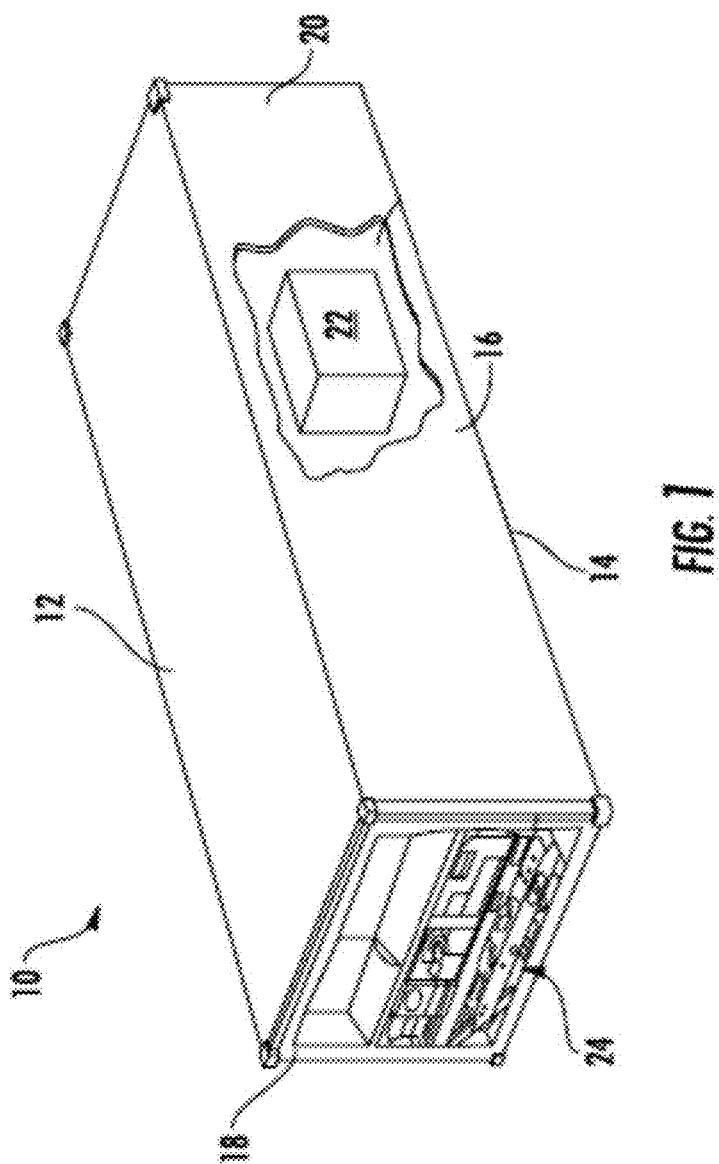
FIG. 1 depicts a refrigerated container in an example embodiment.

The detailed description explains embodiments of the invention, together with advantages and features, by way of example with reference to the drawing.

DETAILED DESCRIPTION

Shown in FIG. 1 is an embodiment of a refrigerated container 10. The container 10 has a generally rectangular construction, with a top wall 12, a directly opposed bottom wall 14, opposed side walls 16 and a front wall 18. The container 10 further includes a door or doors (not shown) at a rear wall 20, opposite the front wall 18. The container 10 is configured to maintain a cargo 22 located inside the container 10 at a selected temperature through the use of a refrigeration unit 24 located at the container 10. The container 10 is mobile and is utilized to transport the cargo 22 via, for example, a truck, a train or a ship. The container 10 may be integrated with a trailer or chassis. The refrigeration unit 24 is located at the front wall 18, and includes a compressor 26, a condenser 28, an expansion device 30 (e.g., a TXV or EXV), an evaporator 32 and an evaporator fan 34 (shown in FIG. 2), as well as other ancillary components.

Figure 2:
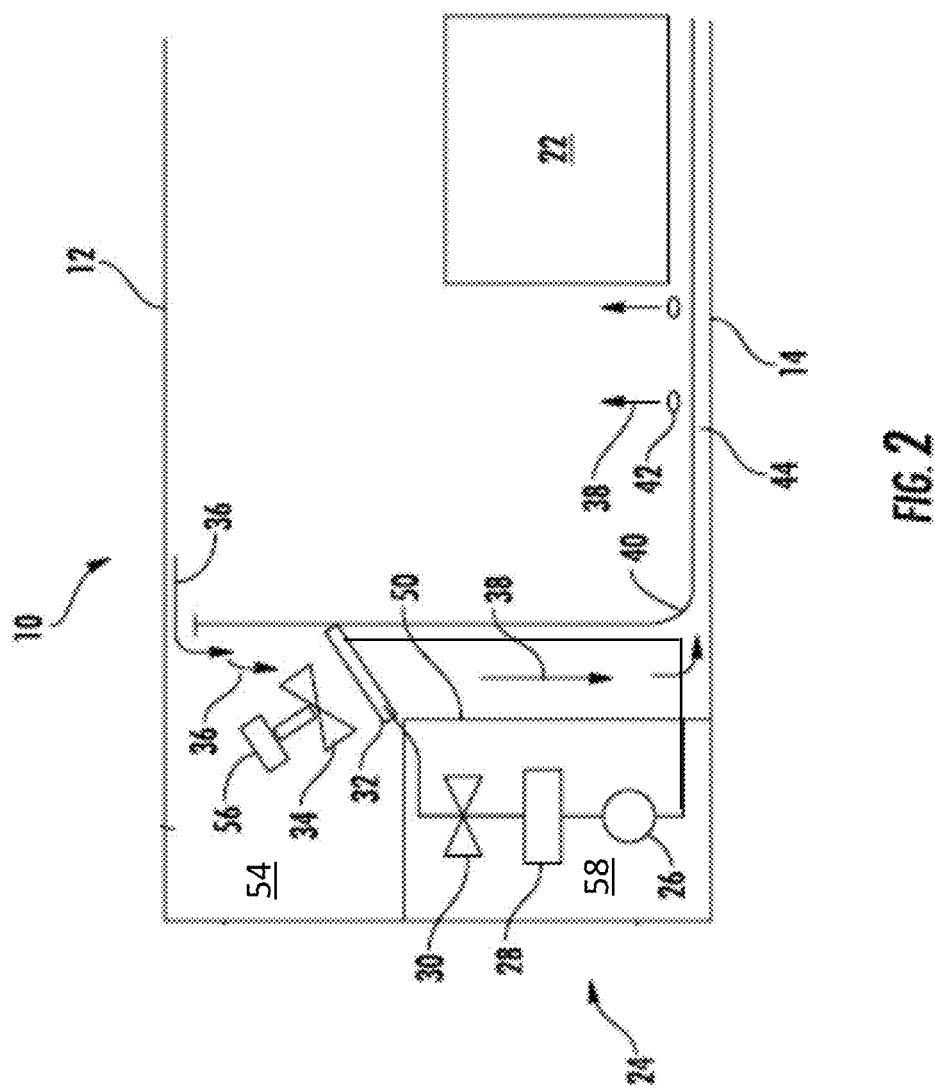
FIG. 2 depicts a refrigeration unit in an example embodiment.

Referring to FIG. 2, the refrigeration unit 24 flows return air 36 across the evaporator 32 via the evaporator fan 34, thus cooling the return air 36 to a selected temperature and urges the cooled return airflow 36, now referred to as supply air 38, through a refrigeration unit outlet 40 into the container 10 via, for example, openings 42 in one or more T-bars 44 extending along the bottom wall 14 of the container 10 to cool the cargo 22.

The refrigeration unit 24 is separated into an evaporator section 54 containing the evaporator 32, the evaporator fan 34 and an evaporator fan motor 56 and a condenser section 58 containing the compressor 26, the condenser 28 and the expansion device 30. In some embodiments, the expansion device 30 may be located in the evaporator section 54. The evaporator section 54, located above the condenser section 58 in some embodiments, is separated from the condenser section 58 by a panel 50 that extends across the refrigeration unit 24. The condenser section 58 is exposed to ambient air and may be covered by panels having openings formed therein. In operation, refrigerant is circulated in serial fashion through the compressor 26, the condenser 28, the expansion device 30, the evaporator 32 and back to the compressor 26. It is understood that the refrigeration unit 24 may include additional components (e.g., economizer, receiver, SMV, etc.) that are not shown.

Figure 3:
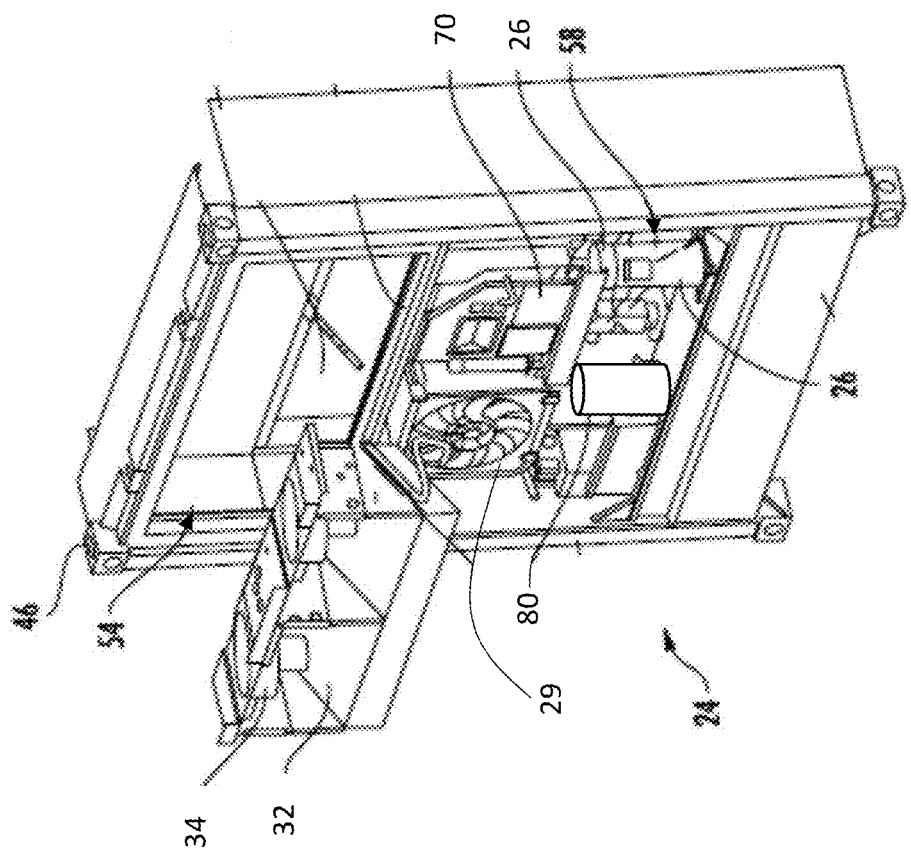
FIG. 3 depicts a refrigeration unit with an atmosphere control system in an example embodiment.

Referring now to FIG. 3, the refrigeration unit 24 includes a housing 46 to contain components of the refrigeration unit 24. In some embodiments, the housing 46 is separate and distinct from the container 10, while in other embodiments, the housing 46 is an integral part of the container 10. A condenser fan 29 is driven by a condenser motor (not shown) to drive air over the condenser 28 and discharge the air outside the refrigeration unit 24. The condenser 28 may be radially disposed about the condenser fan 29. A controller 70 controls operation of the refrigeration unit 24, for example, by controlling the compressor 26 (e.g., on/off/variable speed), evaporator fan motor 56 (e.g., on/off/variable speed), condenser fan motor (e.g., on/off/variable speed), etc. The controller 70 may be implemented using a processor-based device including a microprocessor, memory, user interface, I/O inputs, etc. The controller 70 controls components of the refrigeration unit 24 to maintain a desired temperature within the interior of the container 10, as known in the art. An air compressor 80 is located in the condenser section 58. The air compressor 80 is a component of an atmosphere control system 74 (FIG. 4) that operates to regulate atmosphere (e.g., oxygen and carbon dioxide) in the interior of the container 10.

Figure 4:
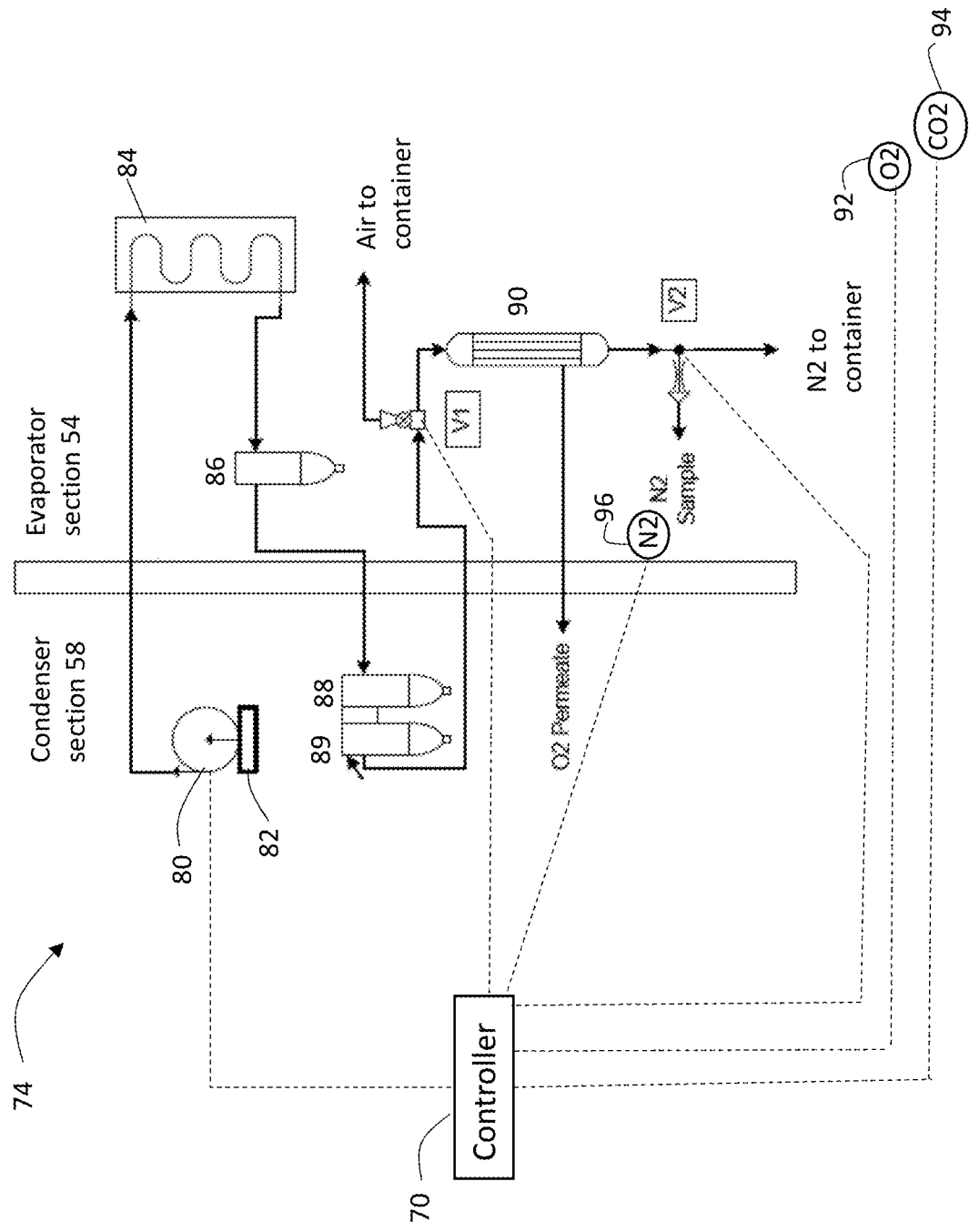
FIG. 4 depicts an atmosphere control system in an example embodiment.

FIG. 4 depicts the atmosphere control system 74 in an example embodiment. The atmosphere control system 74 operates to control levels of at least one gas inside the container 10. In an embodiment, the atmosphere control system 74 operates to control levels of oxygen and/or carbon dioxide. The atmosphere control system 74 includes the air compressor 80 located in the condenser section 58 and thus outside the interior of the container 10. The controller 70 may turn on the air compressor 80 by sending a signal to a relay or contactor that applies power to the air compressor 80. When turned on, the air compressor 80 draws air from outside the container 10 through a first filter 82 (e.g., a 50 micron particulate filter). The compressed air produced by the air compressor 80 flows from the condenser section 58 into the evaporator section 54 to a heat exchanger 84. The heat exchanger may be an air-cooled heat exchanger of various types (e.g., round tube plate fin, microchannel, etc.). At heat exchanger 84, the compressed air is cooled to facilitate water removal. From the heat exchanger 84, the compressed air flows to a water separator 86 where water is removed. From the water separator 86, the compressed air flows to a second filter 88 (e.g., a 5 micron particulate filter) and a third filter 89 (e.g., a 0.01 micron particulate filter). The second filter 88 and the third filter 89 may be located in the condenser section or the evaporator section 54.

From the second filter 88 and the third filter 89, the compressed air flows to a first valve, V1. The first valve V1 has two outlets, which can be controlled by controller 70. When the first valve V1 is in a first position (e.g., an open position when energized), the compressed air is output from the first valve V1 to the interior of the container 10. The first valve V1 may be located to provide the air upstream of the evaporator 32. When the first valve V1 is in a second position (e.g., a closed position when not energized), the compressed air is directed to a separator 90. The separator 90 may be a membrane separator that generates an output of highly pure, separated nitrogen upstream of evaporator 32. Other atmospheric gases, including oxygen, argon and carbon dioxide, are vented to the condenser section 58 and outside of the refrigeration unit 24. The nitrogen from separator 90 is directed to a second valve V2. The second valve V2 is a bleeder port that allows a small portion of the nitrogen from the separator 90 to be sent to a nitrogen sensor 96 to measure the purity of the nitrogen. The second valve V2 may be controlled by the controller 70.

When nitrogen is provided upstream of the evaporator 32, the nitrogen enters the interior of the container 10 and forces oxygen and/or carbon dioxide out of the interior of the container 10. Reducing the oxygen level in the container 10 reduces ripening of produce. Reducing the carbon dioxide level in the container 10 prevents damage to cargo in the container due to high carbon dioxide levels.

In operation, the controller 70 monitors levels of at least one gas inside the container 10, using oxygen sensor 92 and/or carbon dioxide sensor 94 in communication with the controller 70. The oxygen sensor 92 and/or carbon dioxide sensor 94 may be located in the evaporator section 54, upstream of the evaporator 32. To add outside air to the container, the controller 70 sends a signal to turn on the air compressor 80 and sends a signal to the first valve V1 to set the first valve V1 to the open position. This directs the compressed air from the air compressor 80 to the interior of the container 10. To add nitrogen to the container to control the levels of other gasses, the controller 70 sends a signal to turn on the air compressor 80 and closes valve V1. This directs the compressed air from the air compressor 80 to the separator 90, which produces nitrogen that is directed to the interior of the container 10 (e.g., upstream or downstream of the evaporator 32). To measure purity of the nitrogen generated by the separator 90, the controller 70 opens the bleeder port of the second valve V2 to direct a portion of the nitrogen to the nitrogen sensor 96 in communication with the controller 70. In some embodiments, a separate nitrogen sensor 96 is not used, as the measurements from the oxygen sensor 92 provides an indication of the nitrogen level in the container 10.

Figure 5:
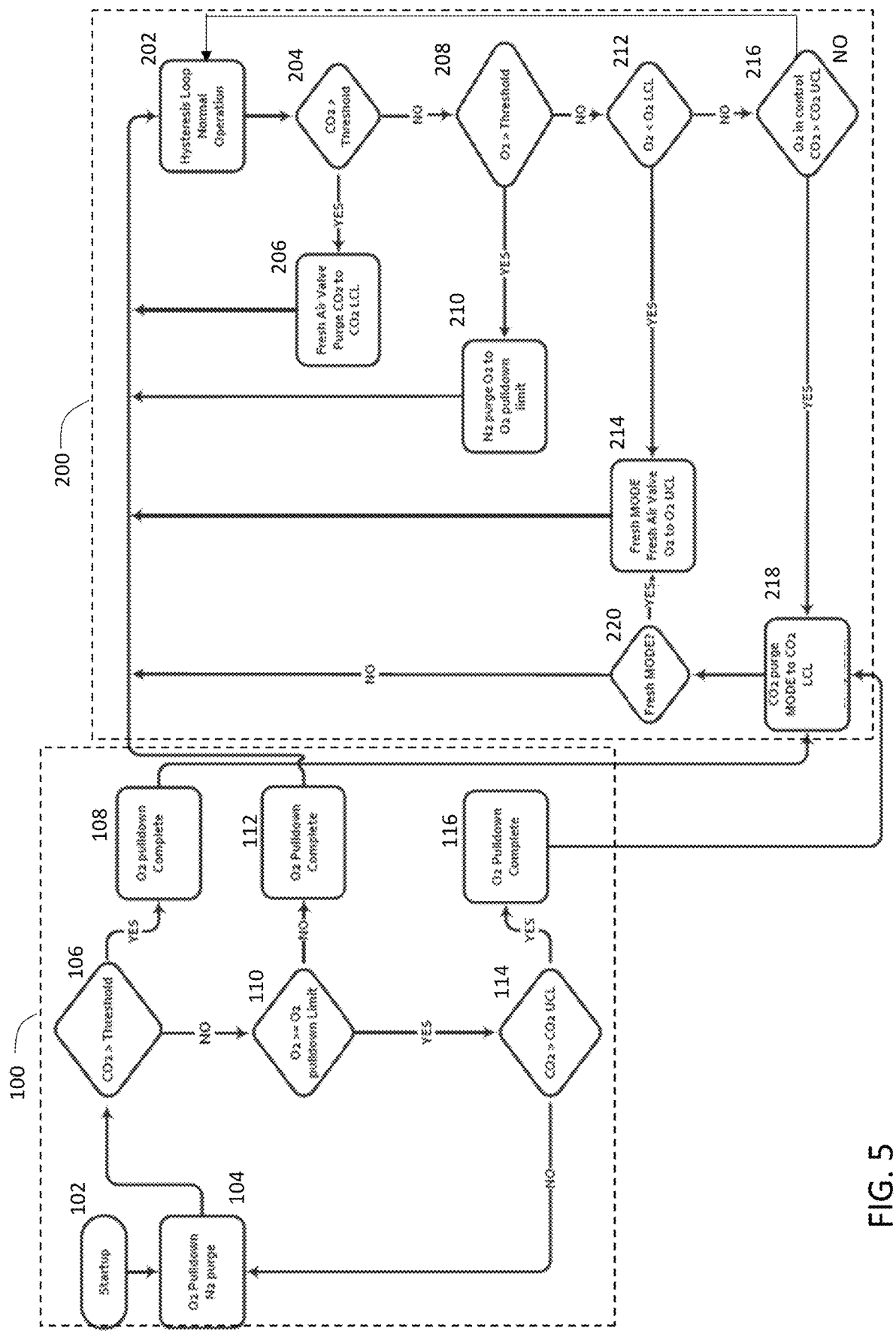
FIG. 5 depicts a process for controlling an atmosphere in a container in an example embodiment.
Figure 6:
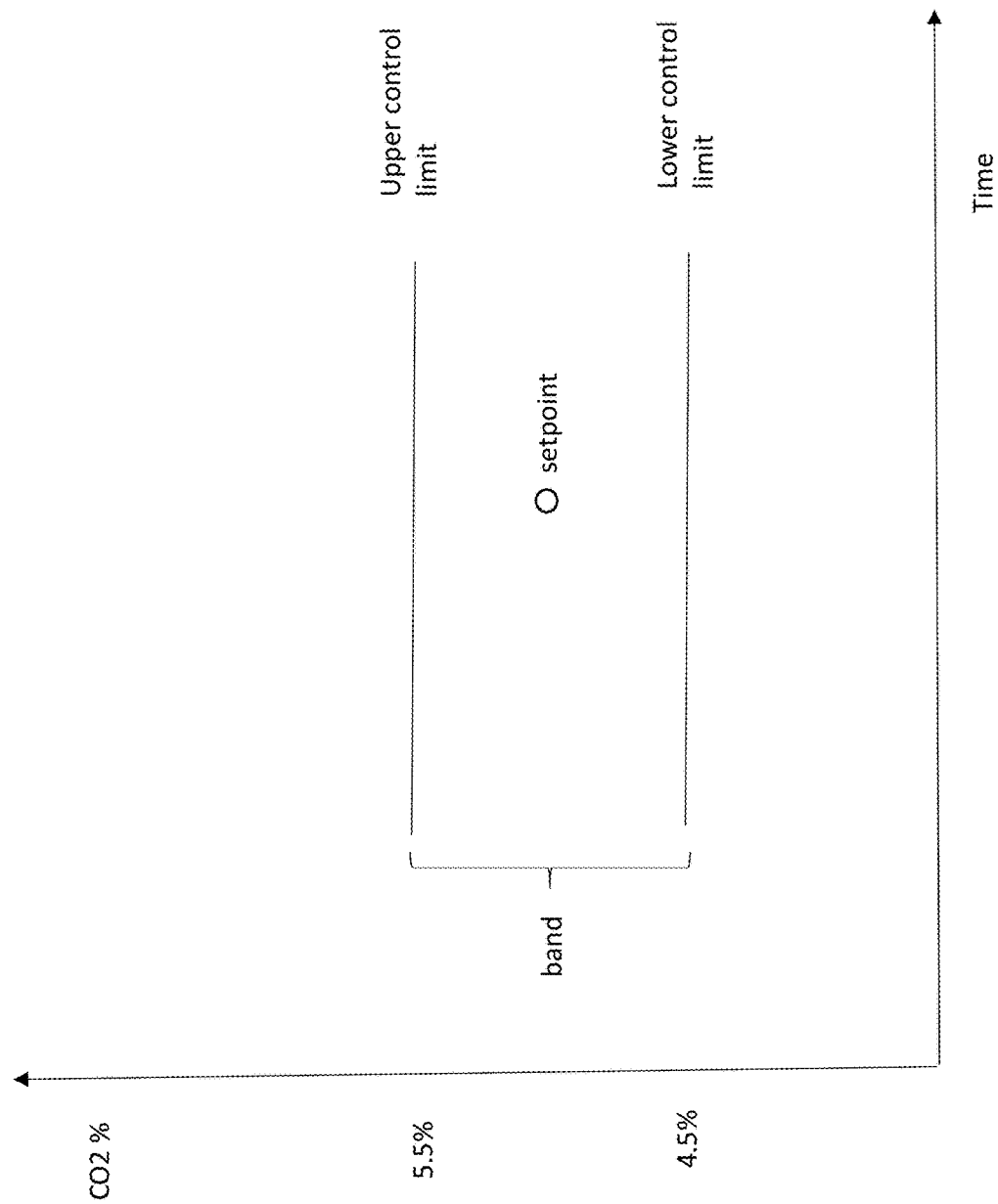
FIG. 6 depicts carbon dioxide control parameters in an example embodiment.

FIG. 5 depicts a process for controlling the atmosphere control system 74 in an example embodiment. The process is executed by the controller 70. The process includes a start up phase 100 and a control phase 200. The process may regulate oxygen and carbon dioxide levels (measured, for example, in percentages) in the container 10 using control bands. FIG. 6 depicts an example control band for the carbon dioxide level in the container 10. The control band includes a lower control limit and an upper control limit which define a control band. A setpoint is typically set in the middle of the control band, but may be at any location. FIG. 6 depicts example values for controlling the carbon dioxide level in the container 10. The oxygen level in the container 10 may be controlled using a similar control band, although with different numerical values.

Referring to FIG. 5, the start up phase 100 begins at 102 and flows to 104 where an oxygen pulldown operation is started. The oxygen pulldown operation at 104 includes powering on the air compressor 80 and setting valve V1 to the closed position to add nitrogen to the container 10. The oxygen pulldown operation at 104 may last for a period of time (e.g., 40 hours). When the oxygen pulldown operation at 104 ends, flow proceeds to 106 where the controller 70 compares the carbon dioxide level in the container 10 (measured by CO2 sensor 94) to a carbon dioxide upper threshold. The carbon dioxide upper threshold may be equal to the carbon dioxide setpoint, plus the carbon dioxide control band plus a first offset (e.g., 2%). If at 106 the carbon dioxide level in the container 10 is greater than the carbon dioxide upper threshold at 106, then flow proceeds to 108 where the oxygen pulldown operation is considered complete.

If at 106 the carbon dioxide level in the container 10 is not greater than the upper threshold, then flow proceeds to 110 where the controller 70 determines if the oxygen level in the container 10 (measured by O2 sensor 92) is greater than or equal to an oxygen pulldown limit (e.g., a minimum oxygen level achievable by adding nitrogen to the container 10). If at 110, the oxygen level in the container 10 is not greater than or equal to the oxygen pulldown limit, then flow proceeds to 112 where the oxygen pulldown operation is considered complete. At 112, the controller 70 turns off the air compressor 80.

If at 110, the oxygen level in the container 10 is greater than or equal to the oxygen pulldown limit, then flow proceeds to 114, where the controller 70 determines if the carbon dioxide level in the container 10 is greater than a carbon dioxide upper control limit. If the carbon dioxide level in the container 10 is greater than a carbon dioxide upper control limit then flow proceeds to 116 where the oxygen pulldown operation is considered complete. If at 114, the carbon dioxide level in the container 10 is not greater than the carbon dioxide upper control limit then flow proceeds to 104 where the oxygen pulldown operation is continued for additional time (e.g., 10 hours) and the process continues.

From block 112, the process flows to block 202 of the control phase 200, referred to as normal operation. Flow proceeds to block 204 where the controller 70 compares the carbon dioxide level in the container 10 to the carbon dioxide upper threshold. If at 204 the carbon dioxide level in the container 10 is greater than the carbon dioxide upper threshold, flow proceeds to 206. An alarm may be generated at 204. At 206, the air compressor 80 is turned on and valve V1 is set to the open position to add air to the container 10. The system stays in this state until the carbon dioxide level in the container 10 equals the carbon dioxide lower control limit. At this point, the air compressor 80 is turned off and flow proceeds to 202.

If at 204 the carbon dioxide level in the container 10 is not greater than the carbon dioxide upper threshold, flow proceeds to 208. At 208, the controller 70 compares the oxygen level in the container 10 to an oxygen upper threshold. The oxygen upper threshold may be equal to the oxygen setpoint, plus the oxygen control band plus a second offset (e.g., 0.2%). If at 208 the oxygen level in the container 10 is greater than the oxygen upper threshold, flow proceeds to 210. At 210, the air compressor 80 is turned on and valve V1 is set to the closed position to add nitrogen to the container 10. The system stays in this state until the oxygen level in the container 10 equals the oxygen pulldown limit. At this point, the air compressor 80 is turned off and flow proceeds to 202.

If at 208 the oxygen level in the container 10 is not greater than the oxygen upper threshold, flow proceeds to 212. At 212, the controller 70 compares the oxygen level in the container 10 to an oxygen lower control limit. If at 212 the oxygen level in the container 10 is less than the oxygen lower control limit, flow proceeds to 214. At 214, the air compressor 80 is turned on and valve V1 is set to the open position to add air to the container 10. The system stays in this state until the oxygen level in the container 10 equals the oxygen upper control limit. At this point, the air compressor 80 is turned off and flow proceeds to 202.

If at 212 the oxygen level in the container 10 is not less than the oxygen lower control limit, flow proceeds to 216. At 216, the controller 70 compares the carbon dioxide level in the container 10 to the carbon dioxide upper control limit. If at 216 the carbon dioxide level in the container 10 is not greater than the carbon dioxide upper control limit, flow proceeds to 202. If at 216 the carbon dioxide level in the container 10 is greater than the carbon dioxide upper control limit, flow proceeds to 218. It is also noted that block 108 and block 116 also lead to block 218.

At 218, the air compressor 80 is turned on and valve V1 is set to the second position to add nitrogen to the container 10. The system stays in this state until the carbon dioxide level in the container 10 equals the carbon dioxide lower control limit.

From 218, the process flows to 220 where the controller 70 determines if a fresh air mode should be entered. At 220, the controller 70 determines if the oxygen level in the container 10 is less than the oxygen lower control limit. If the oxygen level in the container 10 is less than the oxygen lower control limit, fresh air mode is enabled, and the process flows to 214. Otherwise, the process returns to 202.

The control process of FIG. 5 only requires control of the air compressor 80 and the first valve V1. This simplifies the control process and eliminates for a dedicated controller for the atmosphere control system 74. The controls process maintains proper atmosphere in the container 10 and accounts for wide variations in container leakage and/or cargo respiration.

As described above, embodiments can be in the form of processor-implemented processes and devices for practicing those processes, such as a processor in controller 70. Embodiments can also be in the form of computer program code containing instructions embodied in tangible media, such as network cloud storage, SD cards, flash drives, floppy diskettes, CD ROMs, hard drives, or any other computer-readable storage medium. Embodiments can also be in the form of computer program code transmitted over some transmission medium, such as over electrical wiring or cabling, through fiber optics, or via electromagnetic radiation. When implemented on a general-purpose microprocessor, the computer program code configure the microprocessor to create specific logic circuits.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of operating an atmosphere control system to control an atmosphere in a refrigerated container, the method comprising:
operating the atmosphere control system in a start up phase including adding nitrogen to the container to control an oxygen level and a carbon dioxide level in the container;
ending the start up phase upon both (i) the oxygen level being greater than an oxygen pulldown limit corresponding to reduced oxygen level achievable by adding nitrogen to the container and (ii) the carbon dioxide level being greater than or equal to a carbon dioxide upper control limit; and
operating the atmosphere control system in a control phase to control the oxygen level and the carbon dioxide level in the container;
wherein the control phase comprises determining that the carbon dioxide level in the container is greater than a carbon dioxide upper threshold;
wherein when the carbon dioxide level in the container is greater than the carbon dioxide upper threshold, adding outside air to the container until the carbon dioxide level in the container is equal to or less than a carbon dioxide lower control limit, wherein the outside air is sourced from ambient air.

2. The method of claim 1 wherein:
ending the start up phase comprises ending the start up phase upon the oxygen level in the container is equal to or less than the oxygen pulldown limit corresponding to reduced oxygen level achievable by adding nitrogen to the container.

3. The method of claim 2 wherein:
the control phase includes adding nitrogen to the container until the carbon dioxide level in the container is equal to or less than the carbon dioxide lower control limit.

4. The method of claim 3 further comprising:
adding outside air to the container until the oxygen level in the container is equal to or greater than an oxygen upper control limit.

5. The method of claim 1 wherein:
ending the start up phase comprises ending the start up phase upon the oxygen level in the container is not greater than or equal to the oxygen pulldown limit corresponding to reduced oxygen level achievable by adding nitrogen to the container.

6. The method of claim 1 wherein:
the control phase comprises determining that the oxygen level in the container is greater than an oxygen upper threshold;
adding nitrogen to the container until the oxygen level in the container is equal to or less than the oxygen pulldown limit corresponding to reduced oxygen level achievable by adding nitrogen to the container.

7. The method of claim 1:
wherein:
the control phase comprises determining that the oxygen level in the container is less than an oxygen lower control limit;
adding outside air to the container until the oxygen level in the container is equal to or less than an oxygen upper control limit, wherein the outside air is sourced from ambient air.

8. The method of claim 1 wherein:
the control phase comprises determining that the carbon dioxide level in the container is greater than the carbon dioxide upper control limit;
when the carbon dioxide level in the container is greater than the carbon dioxide upper control limit, adding nitrogen to the container until the carbon dioxide level in the container is equal to or less than the carbon dioxide lower control limit.

9. The method of claim 8 further comprising:
adding outside air to the container until the oxygen level in the container is equal to or greater than an oxygen upper control limit.

10. The method of claim 1 wherein:
the control phase includes adding nitrogen to the container until the carbon dioxide level in the container is equal to or less than the carbon dioxide lower control limit.

11. A method of operating an atmosphere control system to control an atmosphere in a refrigerated container, the method comprising:
operating the atmosphere control system in a start up phase including adding nitrogen to the container to control an oxygen level and a carbon dioxide level in the container;

ending the start up phase upon both (i) the oxygen level being greater than an oxygen pulldown limit corresponding to reduced oxygen level achievable by adding nitrogen to the container and (ii) the carbon dioxide level being greater than or equal to a carbon dioxide upper control limit; and operating the atmosphere control system in a control phase to control the oxygen level and the carbon dioxide level in the container;

wherein the control phase comprises determining that the carbon dioxide level in the container is greater than a carbon dioxide upper threshold;

wherein when the carbon dioxide level in the container is greater than the carbon dioxide upper threshold, adding outside air to the container until the carbon dioxide level in the container is equal to or less than a carbon dioxide lower control limit, wherein the outside air is sourced from ambient air;

wherein the start up phase comprises adding nitrogen to the container until the oxygen level in the container is equal to or less than the oxygen pulldown limit corresponding to reduced oxygen level achievable by adding nitrogen to the container;

wherein the control phase comprises determining that the oxygen level in the container is greater than an oxygen upper threshold and adding nitrogen to the container until the oxygen level in the container is equal to or less than the oxygen pulldown limit corresponding to reduced oxygen level achievable by adding nitrogen to the container;

wherein the control phase comprises determining that the carbon dioxide level in the container is greater than a carbon dioxide upper control limit and when the carbon dioxide level in the container is greater than the carbon dioxide upper control limit, adding nitrogen to the container until the carbon dioxide level in the container is equal to or less than the carbon dioxide lower control limit;

wherein the control phase comprises adding outside air to the container until the oxygen level in the container is equal to or greater than an oxygen upper control limit.

* * * * *